Sept. 5, 1933.    H. C. HUMES ET AL    1,925,385
SCREW DRIVER WITH SCREW HOLDERS
Filed Nov. 8, 1932
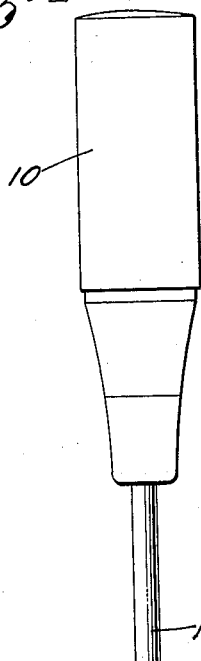
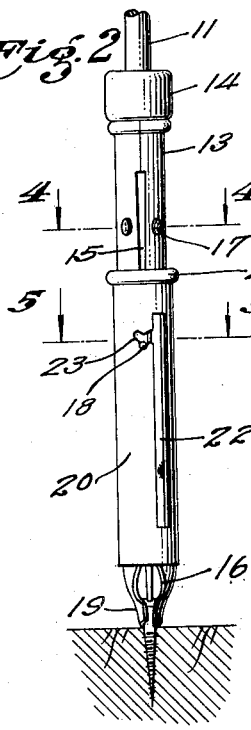
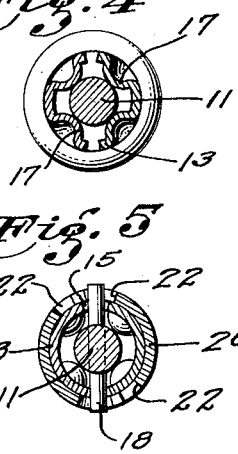
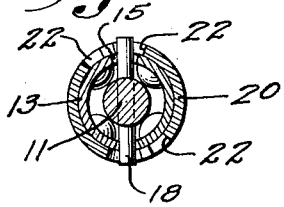
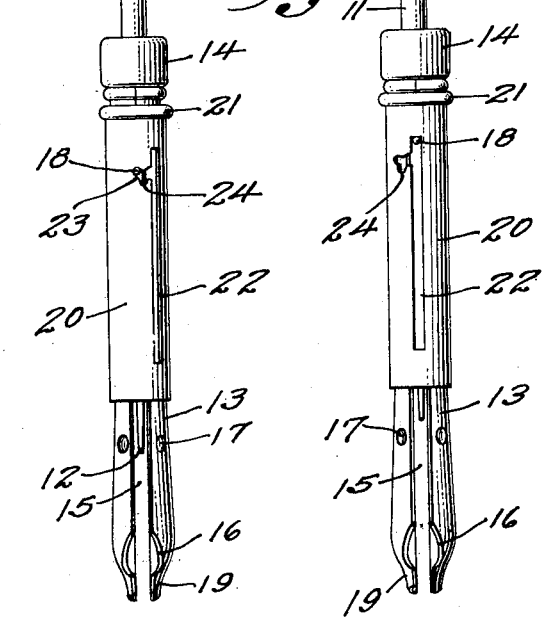
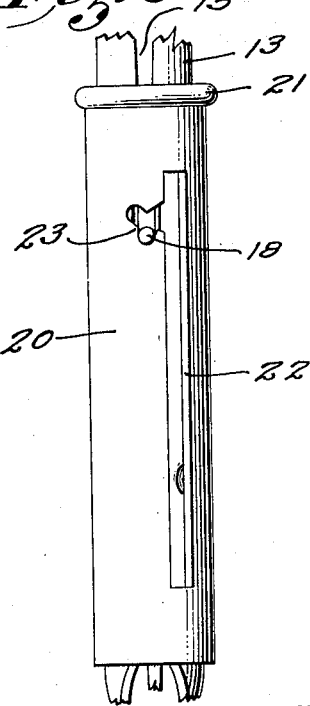
INVENTORS
HOMER C. HUMES
GEORGE L. ROBINSON
BY *Ernest L. Wallace*
ATTORNEY Patented Sept. 5, 1933

1,925,385

UNITED STATES PATENT OFFICE 1,925,385

SCREW DRIVER WITH SCREW HOLDERS

Homer C. Humes and George L. Robinson, Los Angeles, Calif.

Application November 8, 1932. Serial No. 641,698

7 Claims. (Cl. 145—52)

This invention relates to a screw driver adapted to hold the head of a screw in steady position enabling driving it truly into place and countersinking it if desired. It comprises a holding sleeve having an expansible outer end with jaws to receive the head and shank of a screw and which is mounted over the shank of a screw driver. A clamping sleeve is mounted over the holding sleeve for contracting the latter to clamping position. The invention also contemplates a driver wherein the screw may be released by a pull on the screw driver. Provision is also made for operating the tool so as to grip a screw by pushing the screw driver over a screw head or to capture lost screws, nails and the like. The invention appertains to a screw driver of the type disclosed in our application for United States Letters Patent Ser. No. 594,-436, filed February 23, 1932, subsequently issued as Patent 1,889,330, November 29, 1932, and has for its object the provision of details of structure whereby the efficiency, ease of manipulation, compactness, appearance and economy of manufacture are increased.

These objects are obtained by means of the embodiment of our invention illustrated in the accompanying drawing, in which:—

Fig. 1 is an elevational view of a screw driver, parts being shown in position for removal of a screw or fishing; Fig. 2 is an elevational view of a fragment of the screw driver with parts in a position successive to that of Fig. 1, that is, screw holding position; Fig. 3 is an elevational view of a fragment of the screw driver showing the parts of the attachment in screw released position; Figs. 4 and 5 are sections taken on the planes correspondingly designated by numerals in Fig. 2; and Fig. 6 is an enlarged fragmentary view to better show the nature of the clamping sleeve lock.

Referring with more particularity to the drawing, a screw driver of a conventional type is shown, although as will be obvious as the description proceeds, the invention may be applied to standard ratchet type screw drivers. The particular screw driver illustrated herein comprises a handle 10 and a shank 11 with a tip 12 adapted to be inserted in the kerf of a screw. Slidably mounted on the shank 11 is a screw holding sleeve 13 preferably formed of resilient material divided longitudinally into halves and secured together by a collar 14. Diametrically opposite slits 15 extending to a lower end of the sleeve and ending short of the upper end are thus provided. One of the slits is enlarged adjacent its lower end as indicated by 16 to allow the insertion of a screw head from that side. This construction provides a radially expansible sleeve and the sleeve is initially set with its sections sprung outwardly. Indentations 17 in the sleeve are provided to engage the driver shank 11 and steady the sleeve. A stop pin 18 is mounted in the shank 11 and extends outwardly therefrom in position to ride in the ways formed by slits 15. The bore of the holding sleeve 13 is such as to permit the shank and tip to be moved longitudinally. The end of sleeve 13 is tapered to provide jaws 19 which are bevelled at their edges to provide cutting blades for countersinking the hole formed by a screw and enable reception of the screw head therein. The outer lips of the jaws are bevelled peripherally and the edges facing one another are bevelled. However, the jaws will countersink without such bevelling. The sleeve 13 is preferably of uniform outer diameter when contracted.

Slidably mounted over the sleeve 13 is an outer or clamping sleeve 20. The clamping sleeve is arranged with a bead 21 so that it may be conveniently moved by the operator pushing on the bead. Longitudinal slots 22 accommodate travel of the stop pin 18. Keeper slots 23 extend laterally from slots 22 so that the stop pin may be disposed therein as shown in Figs. 1 and 2. The slots 23 are angled with the apex pointing downwardly and provided with coves 24.

The handle 10 is grasped in the palm of the hand and the holding sleeve 13 pushed forward by pressing with the thumb against collar 14. This will project sleeve 13 with the jaws forward of clamping sleeve 20 which will be held at the limit of its forward movement by stop pin 18 engaging the inner ends of slits 15. A screw may now be inserted with its head between jaws 19. The jaws are then pinched together and held by the fingers of the other hand and the driver is pushed forward until the tip of the driver engages in the kerf of the screw. The clamping sleeve 20 is then pushed forwardly with the thumb and finger of the hand holding the handle so as to contract the holding sleeve 13. The screw is now firmly held and may be driven. To release the screw, a quick rearward pull is exerted on the handle. The shank 11 is pulled drawing with it sleeve 20 and sliding it over sleeve 13 to enable expansion of the holding jaws and release of the screw as shown in Fig. 3. Before releasing, a countersink may be formed in the wood by driving into the wood until the jaws have cut a countersink the size of the screw head. The driver is then backed up a few turns to provide room for the jaws to open and the screw released by a pull on the handle. The holding sleeve 13 is then pulled back until the tip of the driver extends through the jaws and the driver may be operated in the conventional way to seat the screw. In the positions of the parts as just described, the pin 18 is not disposed in keeper slots 23.

To remove screws, the driver tip is projected beyond the jaws as before described and the screw is backed up about one half way to loosen it. The jaws 19 are now opened by pushing forward on collar 14 to slide sleeve 13 to projected position with jaws open. Sleeve 20 is now turned to cause pin 18 to enter keeper slots 23 and pass to the far end as shown in Fig. 1. The open jaws 19 are brought over the head of the screw and handle 10 pressed downwardly. This causes the pin 18 to ride downwardly into coves 24 and push clamping sleeve 20 forwardly to lock jaws 19 over the head and also to project the tip of the driver against the head of the screw such that it may find the kerf on being turned. The screw may be released by a pull on the handle 10, the sleeve 13 being held, or by pushing downwardly on collar 14, pin 18 engaging the upper wall of the leg of keeper slots 23 and riding into slots 22 and thence retracting the clamping sleeve. The angled keeper slots 23 insure against accidental displacement of pin 18 when the screw driver is being directed to screw engaging position. The pin 18 and slots 23 form a rotary catch for the driver and clamping sleeve 20.

The device may be used as a fishing tool for screws and the like. The parts are set for removal of a screw as shown in Fig. 1. The jaws are straddled over the screw or part to be captured and the handle pressed down to contract the jaws and grip the "fish" which may then be picked up.

What we claim is:—

1. The combination of a screw driver having a shank; a screw holding attachment comprising an inner sleeve of resilient material slidably mounted on said shank, said inner sleeve being longitudinally slit from its outer end to a point short of its inner end whereby to provide jaws and ways and to be radially expansible at its outer end enabling introduction of the head and shank of a screw into the bore of said inner sleeve, said jaws externally tapering and having cutting edges to provide a countersink, an outer clamping sleeve slidably mounted over said inner sleeve so as to be disposable to contract said inner sleeve, a rotary catch between said shank and outer clamping sleeve including a stop pin secured to said shank and slidable in said way and a lateral angled keeper in said outer clamping sleeve having a downwardly directed apex for said pin whereby the latter may be disposed in said keeper for coupling said shank and outer clamping sleeve in relation to longitudinal movement to enable longitudinal movement of said outer sleeve relative to said inner sleeve to be effected by said shank.

2. The combination of a screw driver having a shank; a screw holding attachment comprising an inner sleeve of resilient material slidably mounted on said shank, said inner sleeve being longitudinally slit from its outer end to a point short of its inner end whereby to provide a way and to be radially expansible at its outer end enabling introduction of the head and shank of a screw into the bore of said inner sleeve, an outer clamping sleeve slidably mounted over said inner sleeve so as to be disposable to contract said inner sleeve, a rotary catch between said shank and outer clamping sleeve including a stop pin secured to said shank and slidable in said way and a lateral angled keeper in said outer clamping sleeve having a downwardly directed apex for said pin whereby the latter may be disposed in said keeper for coupling said shank and outer clamping sleeve in relation to longitudinal movement to enable longitudinal movement of said outer sleeve relative to said inner sleeve to be effected by said shank.

3. The combination of a screw driver having a shank; a screw holding attachment comprising an inner sleeve of resilient material slidably mounted on said shank, said inner sleeve being longitudinally slit from its outer end to a point short of its inner end whereby to provide a way and to be radially expansible at its outer end enabling introduction of the head and shank of a screw into the bore of said inner sleeve, an outer clamping sleeve slidably mounted over said inner sleeve so as to be disposable to contract said inner sleeve, a rotary catch between said shank and outer clamping sleeve including a stop pin secured to said shank and slidable in said way and a lateral angled keeper in said outer clamping sleeve having a downwardly directed apex with a cove for said pin whereby the latter may be disposed in said keeper for coupling said shank and outer clamping sleeve in relation to longitudinal movement to enable longitudinal movement of said outer sleeve relative to said inner sleeve to be effected by said shank.

4. The combination of a screw driver having a shank member; a screw holding attachment comprising an inner sleeve of resilient material slidably mounted on said shank member, said inner sleeve being longitudinally slit and having jaws at its outer end enabling introduction of the head and shank of a screw into the bore of said inner sleeve, said jaws externally tapering and having cutting edges to provide a countersink, an outer clamping sleeve member slidably mounted over said inner sleeve so as to be disposable to contract said inner sleeve, a rotary catch between said members including a stop secured to one of said members and slidable longitudinally in relation to said inner sleeve and a lateral angled keeper in the other member having a downwardly directed apex with a cove for said stop whereby the latter may be disposed in said keeper for coupling said members in relation to longitudinal movement to enable longitudinal movement of said outer sleeve member relative to said inner sleeve to be effected by said shank member.

5. The combination of a screw driver having a shank member; a screw holding attachment comprising an inner sleeve of resilient material slidably mounted on said shank member, said inner sleeve being longitudinally slit and having jaws at its outer end enabling introduction of the head and shank of a screw into the bore of said inner sleeve, said jaws externally tapering and having cutting edges to provide a countersink, an outer clamping sleeve member slidably mounted over said inner sleeve so as to be disposable to contract said inner sleeve, a rotary catch between said members including a stop secured to one of said members and slidable longitudinally in relation to said inner sleeve and a lateral angled keeper in the other member having a downwardly directed apex for said stop whereby the latter may be disposed in said keeper for coupling said members in relation to longitudinal movement to enable longitudinal movement of said outer sleeve member relative to said inner sleeve to be effected by said shank member.

6. The combination of a screw driver having a shank member; a screw holding attachment comprising an inner sleeve of resilient material slidably mounted on said shank member, said inner sleeve being radially expansible at its outer end enabling introduction of the head and shank of a screw into the bore of said inner sleeve, an outer clamping sleeve member slidably mounted over said inner sleeve so as to be disposable to contract said inner sleeve, a rotary catch between said members including a stop secured to one of said members and slidable longitudinally in relation to said inner sleeve and a lateral angled keeper in the other member having a downwardly directed apex with a cove for said stop whereby the latter may be disposed in said keeper for coupling said members in relation to longitudinal movement to enable longitudinal movement of said outer sleeve member relative to said inner sleeve to be effected by said shank member.

7. The combination of a screw driver having a shank member; a screw holding attachment comprising an inner sleeve of resilient material slidably mounted on said shank member, said inner sleeve being radially expansible at its outer end enabling introduction of the head and shank of a screw into the bore of said inner sleeve, an outer clamping sleeve member slidably mounted over said inner sleeve so as to be disposable to contract said inner sleeve, a rotary catch between said members including a stop secured to one of said members and slidable longitudinally in relation to said inner sleeve and a lateral angled keeper in the other member having a downwardly directed apex for said stop whereby the latter may be disposed in said keeper for coupling said members in relation to longitudinal movement to enable longitudinal movement of said outer sleeve member relative to said inner sleeve to be effected by said shank member.

HOMER C. HUMES.
GEORGE L. ROBINSON.